(12) United States Patent
Sadredini et al.

(10) Patent No.: US 11,314,750 B2
(45) Date of Patent: Apr. 26, 2022

(54) METHODS, CIRCUITS, AND ARTICLES OF MANUFACTURE FOR FREQUENT SUB-TREE MINING USING NON-DETERMINISTIC FINITE STATE MACHINES

(71) Applicant: University of Virginia Patent Foundation, Charlottesville, VA (US)

(72) Inventors: Elaheh Sadredini, Charlottesville, VA (US); Kevin Skadron, Charlottesville, VA (US); Gholamreza Rahimi, Charlottesville, VA (US); Ke Wang, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 507 days.

(21) Appl. No.: 16/246,641

(22) Filed: Jan. 14, 2019

(65) Prior Publication Data

US 2019/0228012 A1 Jul. 25, 2019

Related U.S. Application Data

(60) Provisional application No. 62/620,742, filed on Jan. 23, 2018.

(51) Int. Cl.
*G06F 16/2458* (2019.01)
*G06F 16/22* (2019.01)
*G06F 9/448* (2018.01)

(52) U.S. Cl.
CPC ........ *G06F 16/2465* (2019.01); *G06F 9/4498* (2018.02); *G06F 16/2246* (2019.01); *G06F 2216/03* (2013.01)

(58) Field of Classification Search
CPC ............... G06F 16/2465; G06F 9/4498; G06F 16/2246; G06F 2216/03
See application file for complete search history.

(56) References Cited

U.S. PATENT DOCUMENTS

2015/0127602 A1* 5/2015 Luo ........................ G06N 5/025
707/607
2017/0091287 A1* 3/2017 Wang .................. G06F 16/2465
(Continued)

OTHER PUBLICATIONS

Zaki, Mohammed Javeed. "Efficiently mining frequent trees in a forest: Algorithms and applications." IEEE transactions on knowledge and data engineering 17.8 (2005): 1021-1035. (Year: 2005).*
(Continued)

*Primary Examiner* — Usmaan Saeed
*Assistant Examiner* — William P Bartlett
(74) *Attorney, Agent, or Firm* — Stanek Lemon Crouse & Meeks, P.A.

(57) ABSTRACT

A method of searching tree-structured data can be provided by identifying all labels associated with nodes in a plurality of trees including the tree-structured data, determining which of the labels is included in a percentage of the plurality of trees that exceeds a frequent threshold value to provide frequent labels, defining frequent candidate sub-trees for searching within the plurality of trees using combinations of only the frequent labels, and then searching for the frequent candidate sub-trees in the plurality of trees including the tree-structured data using a plurality of pruning kernels instantiated on a non-deterministic finite state machine to provide a less than exact count of the frequent candidate sub-trees in the plurality of trees.

15 Claims, 6 Drawing Sheets

(56) References Cited

U.S. PATENT DOCUMENTS

2017/0097852 A1* 4/2017 Glendenning ............ G06F 8/31
2018/0330008 A1* 11/2018 Fan ................... G06F 16/90335

OTHER PUBLICATIONS

Wang, Ke, et al. "An overview of micron's automata processor." Proceedings of the Eleventh IEEE/ACM/IFIP International Conference on Hardware/Software Codesign and System Synthesis. 2016. (Year: 2016).*

Dlugosch st al., "An Efficient and Scalable Semiconductor Architecture for Parallel Automata Processing," IEEE Transactions on Parallel and Distributed Systems, vol. 25, Issue 12, Dec. 2014, pp. 3088-3098.

Sadredini et al., "Frequent Subtree Mining on the Automata Processor: Challenges and Opportunities," ICS'17 Proceedings of the International Conference on Supercomputing, Article No. 4, Chicago, Illinois, Jun. 14-16, 2017, 11 pages.

Wang et al., "Association Rule Mining with the Micron Automata Processor," IPDPS '15, IEEE, 11 pages.

Wang et al., "Sequential: Pattern Mining with the Micron Automata Processor," CF'16 Proceedings of the ACM International Conference on Computing Frontiers, May 16-19, Como, Italy, pp. 135-144.

* cited by examiner

FIG. 1

|  | K ≤ 10 | 10 < K ≤ 20 | 20 < K ≤ 40 |
|---|---|---|---|
| Sup < 4096 | 4 | 2 | 1 |
| Sup ≥ 4096 | 2 | 2 | 1 |

Table I : 8 Bit Encoding

|  | K ≤ 5 | 5 < K ≤ 10 | 10 < K ≤ 20 |
|---|---|---|---|
| Sup < 4096 | 4 | 2 | 1 |
| Sup ≥ 4096 | 2 | 2 | 1 |

Table II : 16 Bit Encoding

METHODS, CIRCUITS, AND ARTICLES OF MANUFACTURE FOR FREQUENT SUB-TREE MINING USING NON-DETERMINISTIC FINITE STATE MACHINES

CLAIM FOR PRIORITY

This application claims priority to Provisional Application Ser. No. 62/620,742, entitled Frequent Subtree Mining on the Automata Processor: Challenges and Opportunities filed in the U.S. Patent and Trademark Office on Jan. 23, 2018, the entire disclosure of which is hereby incorporated herein by reference.

STATEMENT OF GOVERNMENT SUPPORT

This invention was made with government support under Grant No. HR0011-13-3-0002 awarded by the Department of Defense/Defense Advanced Research Projects Agency (DARPA). The government has certain rights in the invention.

FIELD

The present invention relates to the field of searching in general, and more particularly, to searching using programmable electronic circuits.

BACKGROUND

Frequent subtree mining (FTM) refers to finding all the patterns in a given database of trees (including tree-structured data) whose support is more than a given threshold value, referred to as "minimum support." A particular subtree pattern may be called a frequent subtree if the number of trees in the dataset that have at least one instance of the particular subtree that is isomorphic to the given pattern is more than the minimum support. Frequent subtrees have been used to, for example, parse trees in natural language processing (NLP). Further, in bioinformatics, frequent RNA structures can be used to analyze new RNA structures.

In NLP, frequent subtrees that are mined from the parse tree databases can be used to increase the accuracy of NLP tasks, such as sentiment analysis and question classification problems. However, finding all frequent subtrees may be difficult for a large and dense tree database, due to the combinatorial nature of the subtree candidates.

A mining process, including subtree mining, can be expressed in two steps: 1) candidate generation and 2) enumeration. Candidate generation is used to provide candidate subtrees, which are evaluated for their frequency in the second step stage. The main challenges in candidate generation are efficiently traversing the search space and performing subtree isomorphism. Some research studies have attempted to improve candidate generation using different data structures and counting strategies, based on breadth-first search (BFS) or depth-first search (DFS). BFS solution is a level-wise iterative search method and uses a horizontal tree representation. These approaches can exhibit long processing times and the entire dataset may need to be searched in each iteration. DFS based tree pattern searching strategy can express the database as vertical tree representations for fast support counting, but may encounter memory capacity challenges and costly I/O processing because the set of candidates and their embedding list may overflow memory.

SUMMARY

Embodiments according to the present invention can provide methods, circuits, systems, and articles of manufacture for frequent sub-tree mining using non-deterministic finite state machines. As appreciated by the present inventors, the inherent high parallelism of the AP architecture makes it capable of performing high speed search and analysis on complex and unstructured data. Moreover, by relaxing some of the tree structure constraints, the AP can be effectively utilized to prune the large search space of FTM to arrive at a less than exact search for frequent candidates (i.e., the search may include some false positives while also preventing false negatives) which may be acceptable in some applications. A supplemental search may be performed on the results provided by the AP, using a von Neumann architecture processor to yield an exact search result. Still further, the time needed to perform these two searches can be significantly less than the approach of using a von Neumann architecture processor for the entire search.

Pursuant to these embodiments, a method of searching tree-structured data can be provided by identifying all labels associated with nodes in a plurality of trees including the tree-structured data, determining which of the labels is included in a percentage of the plurality of trees that exceeds a frequent threshold value to provide frequent labels, defining frequent candidate sub-trees for searching within the plurality of trees using combinations of only the frequent labels, and then searching for the frequent candidate sub-trees in the plurality of trees including the tree-structured data using a plurality of pruning kernels instantiated on a non-deterministic finite state machine to provide a less than exact count of the frequent candidate sub-trees in the plurality of trees.

In some embodiments, a search circuit can include a non-Von Neumann architecture processor circuit configured to search for frequent candidate sub-trees in a plurality of trees of nodes including tree-structured data using a plurality of pruning kernels instantiated on a non-deterministic finite state machine to provide a less than exact count of the frequent candidate sub-trees in the plurality of trees.

In some embodiments, a non-transitory computer-readable medium whose contents, when executed by a computing system, cause the computing system to perform operations for configuring a non-Von Neumann architecture processor circuit. These operations can include configuring the non-Von Neumann architecture processor circuit to search for frequent candidate sub-trees in a plurality of trees of nodes including tree-structured data using a plurality of pruning kernels instantiated on a non-deterministic finite state machine to provide a less than exact count of the frequent candidate sub-trees in the plurality of trees of nodes.

DETAILED DESCRIPTION OF EMBODIMENTS ACCORDING TO THE INVENTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As described herein in detail, embodiments according to the invention can include a four-stage pruning framework to greatly reduce the search space of embedded FTM. This framework can provide a scalable solution in terms of both memory and execution time on large databases and lower support thresholds. Frequent subtree candidates in lower thresholds are specifically beneficial as the potential features in classification tasks, where patterns with lower frequency can represent discriminative features in rare classes.

In some embodiments, in order to maintain both ancestor-descendant relationship and sibling properties of a tree structure, and provide a feasible computation, four complementary string representations of the tree structure and their mapping to the automaton representation can be used. This approach may be achieved through the use of pruning kernels to provide a set of potentially frequent candidates that are less than an exact match with an exact set of frequent patterns. In other words, the set of potentially frequent candidates can include a false positive where some of the potentially frequent candidates in the set are not actually frequent candidates. The set of potentially frequent candidates does not, however, include false negatives. In some embodiments where an application may call for an exact solution, a depth-first-search approach that detects the distinct occurrence of a pattern, such as TreeMinerD may be used to trim the results and provide an accurate solution.

Accordingly, in some embodiments, a four-stage pruning framework can be used to prune the search space of a level-wise FTM approach for embedded subtrees. This can eliminate a large portion of infrequent candidates in a reduced time, providing a reliable and scalable solution for large databases. In some embodiments, if a more exact solution is needed, a heterogeneous architecture approach (i.e., the use of the AP and a CPU, for example) can be used to remove false positives while also providing an overall performance improvement compared to using only a CPU (or other von Neumann processor architecture).

In some embodiments, the AP by itself can largely reduce the FTM search space, most of the time very close to the final set of frequent tree candidates. The final set of pruned candidates can be used in the applications, such as classification tasks, where combining the final set of pruned candidates with other features can help remove false positive generated using the AP solution. Moreover, it provides a general strategy where the AP can efficiently prune the search space of the complex problems, such as frequent subgraph mining problem, very quickly. In still further embodiments, mining distinct occurrences of embedded subtrees from ordered and labeled trees can be also can be adopted by unordered embedded and ordered/unordered induced subtree mining with minimal changes.

Frequent Subtree Mining

It will be understood that a tree is an acyclic connected graph, and a forest is an acyclic graph of multiple trees. A rooted tree is a tree with one distinct node called a root. A tree can be defined as an ordered or unordered tree. In the ordered tree, the children of each node are ordered from left to right according to some common property, such that the first child, second child, and so on can be enumerated from left to right. If the order does not matter, the tree is called unordered. A labeled tree is a tree where each node in the tree has an associated label.

Figure 1:
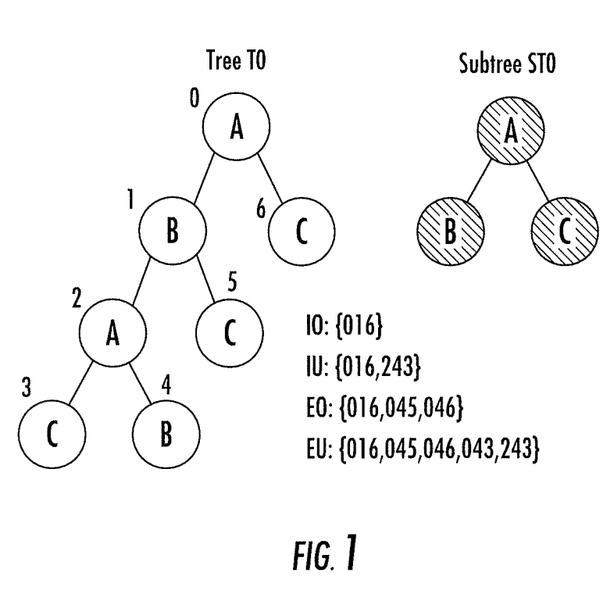
FIG. 1 is a schematic illustration of different types of subtrees in some embodiments.

In tree mining, D can be defined to be a dataset of trees and a transitive subtree relation S is less than or equal to T for some of the trees (T) in D. Define $t_1; t_2; \ldots; t_n$ to be the nodes in T and $s_1; s_2; \ldots; s_m$ be the nodes in S. Then, S is a subtree of T if there are matching labels $t_{i1}; t_{i2}, \ldots; t_{im}$ such that (1) label($s_k$)=label($t_{ik}$) for all k=1, 2, ..., m; and (2) for every branch ($s_j; s_k$) in S, $t_{ij}$, should be an ancestor of $t_{ik}$ in T. The latter condition preserves the structure of S in T. This definition of a subtree refers to an embedded subtree. By restricting the ancestor-descendant relationship to parent-child relationships in T for the second condition, a new kind of subtree, called induced subtree, is defined. FIG. 1 shows an example on different types of subtrees on $T_0$.

Many applications may only count the number of database trees that contain at least one match of a subtree, which is called counting distinct occurrences. On the other hand, weighted counting refers to enumeration of all possible occurrences over all possible trees in the database. The relative minimum support number (Rminsup), is defined as the ratio of minimum support number to the total number of transactions, is used in this paper. The size of a tree is defined as the number of nodes in it. It will be understood that a candidate of size k is referred to herein as a k-candidate (alternatively $C_k$) and a frequent candidate of size k is referred to herein as a k-frequent-candidate (alternatively $F_k$).

Candidate Generation

Our candidate generation step is based on an equivalent class right most extension approach. In this approach, the (k+1)-candidates are generated from the known k-frequent-candidates within an equivalent class (having the same string prefix). Two frequent patterns can be merged based on the position of the last extended node. All the candidates are generated once (to help avoid redundancy) and all are the valid candidates.

Micron's Automata Processor (AP) is an in-memory non-Von Neumann architecture processor that computes nondeterministic finite state automata (or NFA state machines) natively in hardware. The AP allows a programmer to create NFAs and also provides a stream of input symbols to be computed on the NFAs in parallel. This is a fundamental departure from the sequential instruction/data addressing of von Neumann architectures, such as scalar CPU. The AP can directly compute NFAs in hardware, which provides the potential to significantly out-perform software techniques, including DFA conversions and NFA simulations. Specifically, the AP is a reconfigurable fabric of State Transition Elements (STEs), counters, and boolean gates. Each STE is capable of matching a set of any 8-bit symbols and activate a set of following STEs connected to it when the symbols stored in the STE match the input symbol. Counter and boolean elements are designed to extend computational capability beyond NFAs and enhance the space and efficiency of target automata.

A counter can count the occurrence of a pattern described by the NFA connected to it and can activate other elements (or report) when a given threshold is reached. The counters in particular are useful in association rule mining (ARM) and sequential pattern mining (SPM), for counting occurrences against the minimum support threshold. The matching and counting stage of ARM and SPM map to the AP architecture naturally. The matching and counting stage of FTM (which may be a performance bottleneck) can be transformed to several simpler kernels equivalent to the ARM and SPM methods in order to prune the search space of the FTM and provide a scalable solution for large databases. For example, the AP-D480 version of the AP chips include 50 nm DRAM technology, running at an input symbol (8-bit) rate of 133 MHz. The AP-D480 chip has 192 blocks where each block has 256 STEs, 4 counters and 12 Boolean elements. In an AP board with 32 AP chips, all AP chips process input data streams in parallel. Each AP D480 chip may have a worst case power consumption of 4 W.

Input and Output

The AP can receive input streams of 8-bit symbols. A double-buffer strategy for both input and output of the AP chip enables an implicit data transfer/processing overlap. Any STE can be configured to accept the first symbol in the stream, to accept every symbol in the input stream, or to accept a symbol only upon activation. Any type of element on the AP chip can be configured as a reporting element; one reporting element generates a one-bit signal when the element matches the input symbol. One AP chip may have up to 6144 reporting elements. If any reporting element reports on a particular cycle, the chip will generate an output vector which contains 1's in positions corresponding to the elements that report at that cycle and 0's for reporting elements that do not report. If too many output vectors are generated, the output buffer may become full and stall the chip. Thus, minimizing output vectors, and hence the frequency at which reporting events can happen, may be used to improve performance. To address this, structures that wait until a special end-of-input symbol is seen to generate all of its reports in the same clock cycle may be used.

Programming and Configuration

Automata Network Markup Language (ANML) can be used to describe automata networks. To program the AP chip. ANML describes the properties of each element, e.g. STE, counter and Boolean, and how they connect to each other. The Micron's AP SDK also provides C, Java and Python binding interfaces to describe automata networks, create input streams, parse output and manage computational tasks on the AP board. A "macro" is a container of automata for encapsulating a given functionality, similar to a function or subroutine in common programming languages. Macros can be templatized (with the structure fixed but the matching rules for STEs and the counter thresholds to be filled in later).

Placing automata (or NFA state machine circuits) onto the AP fabric can involve three stages: 1) placement and routing compilation (PRC), 2) routing configuration and 3) STE symbol set configuration. In the PRC stage, the AP compiler determines the best element layout and generates a binary version of the automata network. Macros or templates can be precompiled and composed later. This can shorten PRC time because only a small macro needs to be processed for PRC, and the AP can be tiled with as many of these macros as will fit in the AP.

Routing configuration/reconfiguration programs the connections. The symbol set configuration/reconfiguration writes the matching rules and initial active states for the STEs. A precompiled automata performs the last two steps. If only STE rules/states change, only the last step may be performed. Accordingly, the fast symbol replacement helps to deal with the case that the total set of candidate patterns exceeds the AP board capacity; the quick routing reconfiguration enables a fast switch from k to k+1.

As appreciated by the present inventors, subtree inclusion checking may not be easily accomplished using deterministic finite state machines, as a tree structure is more complex than a sequence and therefore may not be described with regular languages. As further appreciated by the present inventors, this implies that instead of a finite state machine, a pushdown automaton (PDA) may be better suited to count the length of a possible branch when searching for a subtree in the input tree. A PDA is a finite automaton with access to a potentially unlimited amount of memory called stack, which is more capable than finite-state machines. The AP mainly supports regular languages, however, boolean and counter elements provide stack functionality with a very limited element size, stack size, and population on the AP. In some embodiments, a balanced parenthesis checking structure issued for the induced FTM problem, which implements a simplified stack structure using counter and STE elements on the AP. The parenthesis checking structures keep track of the branch position in the subtree and is repeated for each node in the subtree, and this repetition consumes a large portion of the available STEs and counters. Furthermore, the depth of the parenthesis checking structure depends on the maximum depth of the trees in the database, which makes it inappropriate to use a database-independent solution. The actual stack functionality is also designed using boolean and STE elements for embedded tree mining problem. For a stack of size 3 and symbol-set of size 4, the stack design needs more than 20 booleans and 48 STEs.

As appreciated by the present inventors, therefore, the AP is a suitable accelerator to prune the search space of the candidate in FTM, when relaxing some of the tree constraints in order to make the simpler representations of a tree to be easily resolved by the AP. In the following section, embodiments including a plurality of pruning kernels are described as being implemented on the AP to shrink the subtree candidate set size which provides a scalable solution to the bigger databases and lower support thresholds. It will be further understood that the approaches described herein can be implemented using other non-von Neumann architectures.

Frequent Sub-Tree Mining

As appreciated by the present inventors, the AP parallelism can be exploited to prune the large search space of the candidate enumeration by simplifying the tree structure to some elementary representations such as ARM (Association Rule Mining) and SPM (Sequential Pattern Mining). In some embodiments, four punning kernels can be employed to reduce the search space: (1) subset pruning, (2) intersection pruning, (3) downward pruning, and (4) connectivity pruning. These kernels map to the variations of association rule mining problems and sequential pattern mining. The first two are independent from the input transaction, while the last two create a new presentation of the trees in the database and use them as the input stream to match against the candidates. The proposed kernels are complementary to each other to avoid overlapping pruning and applied to the candidates in sequence to accommodate more candidates in the early stage.

Frequent Itemset Mining

The frequent itemset mining, also known as ARM problem, was initially studied to find regularities in the shopping behavior of customers of supermarkets and has since been applied to very broad application domains. In the ARM problem, we define $I=i_1; i_2; \ldots i_m$ as a set of interesting items. Let $T=t_1; t_2; \ldots; t_n$ be a database of transactions, each transaction $t_j$ is a subset of I. Define $x_i=\{i_{s1}; i_{s2}; \ldots; i_{sl}\}$ be a set of items in I, called an itemset. The itemset with k items is called k-itemset. A transaction $t_p$ is said to cover the itemset $x_q$ iff $x_q \subseteq t_p$. The support of $x_q$, $Sup(x_q)$, is the number of transactions that cover it. An itemset is known as frequent iff its support is greater than a given threshold value called minimum support, minsup. The goal of association rule mining is to find out all itemsets which supports are greater than minsup. The multiple-entry NFA-based design is proposed to handle variable-size itemsets (ME-NFA-VSI) and avoid routing reconfiguration. The design makes full usage of the massive parallelism of the AP. By using the ME-NFA-VSI structure, one AP board can match and count 18,432 itemsets in parallel with sizes from 2 to 40 for 8-bit encoding and 2 to 24 for 16-bit encoding. In some embodiments, 24 is a reasonable upper bound of the sizes of the itemsets.

Frequent Sequence Mining

Defining $I=i_1, i_2; \ldots; i_m$ as a set of items, where $i_k$ is usually represented by an integer, call item ID. Let $s=<t_1 t_2 \ldots t_n>$ denotes a sequential pattern (or sequence), where $t_k$ is a transaction and also can be called as an itemset. We define an element of a sequence by $t_j=\{x_1; x_2; \ldots, x_m\}$ where $x_k \in I$. We assume that the order within a transaction (itemset) does not matter, so the items within one transaction can be lexicographically ordered in preprocessing stage. Define the size of a sequence as the number of items in it. A sequence with a size k is called a k-sequence. Sequence $s_1=<t_1 t_2 \ldots t_m>$ called to be a subsequence of $s_2=<r_1 r_2 \ldots r_j>$, if there are integers $1 \le k_1 < k_2 \ldots < k_{m-1} < k_m \le j$ such that $t_1 \subseteq r_{k1}, t_2, \subseteq rk_2, \ldots t_m \subseteq r_{km}$. Such a sequence $s_j$ is called a sequential pattern. The support for a sequence is the number of total data sequences that contains this sequence. A sequence is known as frequent iff its support is greater than a given threshold value called minimum support, minsup. The goal of SPM is to find all the sequential patterns whose support is greater than minsup. It is also known as sequential pattern mining.

Figure 2:
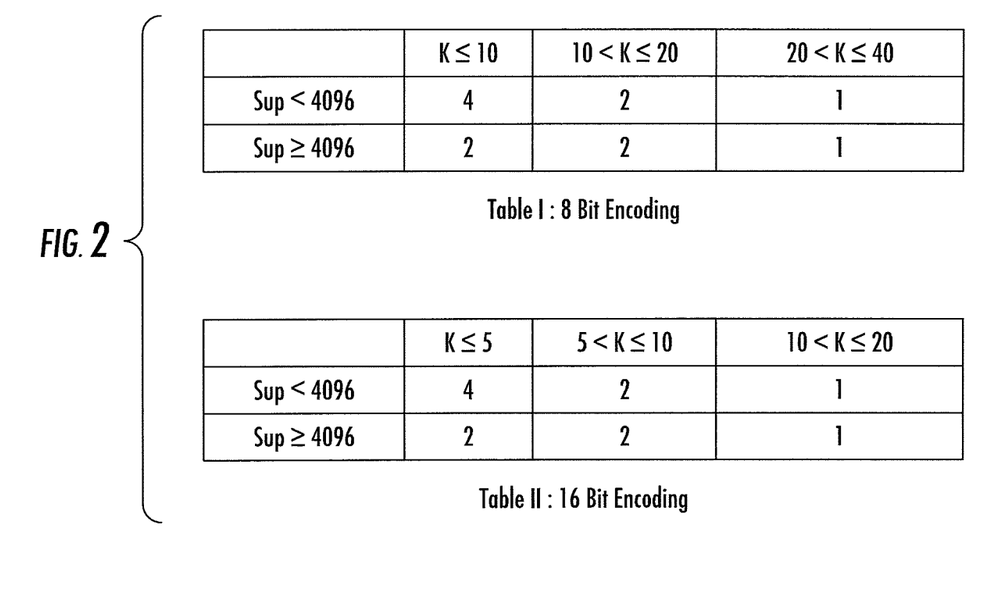
FIG. 2 shows tables illustrating numbers of macros that may fit into one block with 8 and 16-bit encoding in some embodiments.

A key insight that enables the use of automata for SPM is that the hierarchical patterns of sequences can be flattened into strings by using delimiters and place-holders. A multiple-entry NFA strategy is proposed to accommodate variable-structured sequences. Together, this allows a single, compact template to match any candidate sequence of a given length, so this template can be replicated to make full use of the capacity and massive parallelism of the AP. FIG. 2. Table I and II represent capacity information of the SPM macros for different sequence sizes and support threshold.

Pruning Kernels

1) Subset Pruning: According to downward closure principle, all sub-patterns of a frequent pattern must themselves be frequent. It means when generating a (k+1)-candidate, all of its k-candidate should be frequent as well. BFS-based FTM approaches can greatly benefit from this property in order to reduce the search space whereas DFS implementations do not have all the k-frequent-candidates when looking at a (k+1)-candidate. Subset pruning kernel checks the downward closure property for all the candidates of size three and more. This property can be directly mapped to the frequent itemset mining, where each generated (k+1)-candidate represents candidate itemset and the items in the itemset are the set of k-candidates. For example, in FIG. 3, a 5-candidate ($C_{5i}$) is generated from $F_{4i}$ which is a frequent candidate of size 4 by extending the edge AE.

Figure 3:
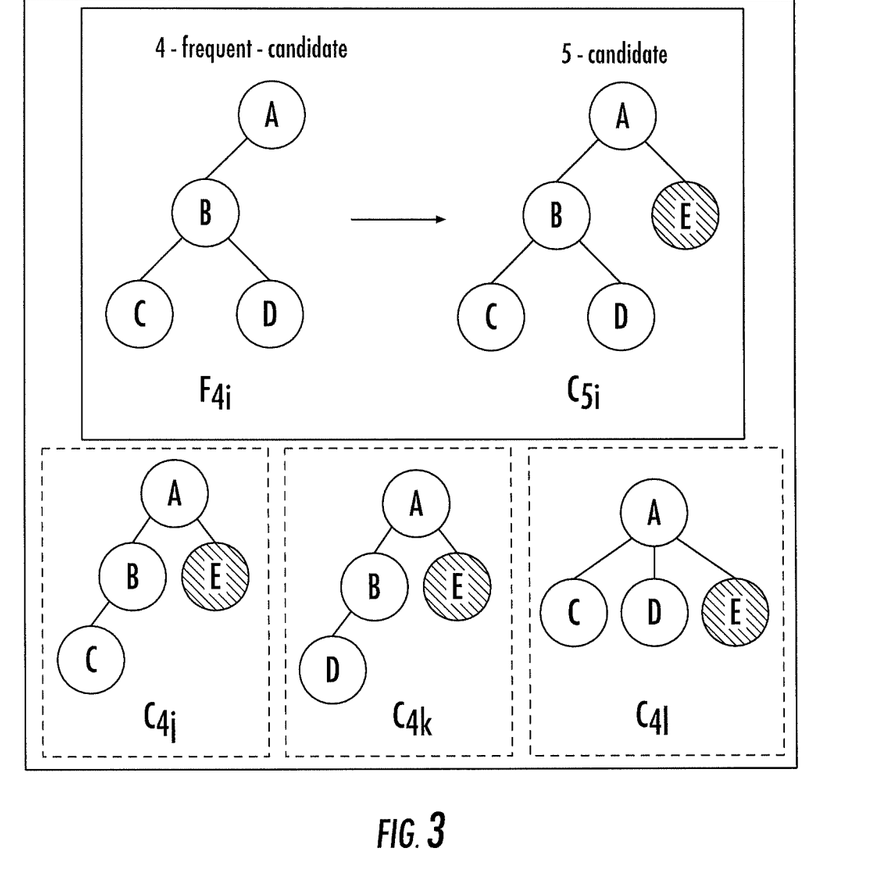
FIG. 3 is a schematic illustration of subset pruning and intersection pruning in some embodiments.

In the subset pruning, we should check $C_{4j}; C_{4k}$, and $C_{4l}$ (which are the other subsets of $C_{5i}$) to be frequent as well. The itemset candidate corresponding to $C_{5i}$ is $C_{5i}=\{C_{4j}; C_{4k}; C_{4l}\}$ and the input dataset has only one transaction which includes of all the frequent candidates of size 4, e.g., $\{F_{40}; F_{41}, \ldots, F_{4m}\}$ (m is the number of 4-frequent-candidate). Therefore, the set of all 5-candidates create the candidate itemsets for ARM. A subtree candidate will survive at this stage if it occurs in the input transaction (Rminsup is 100% here). The CPU implementation adds each individual frequent subtree into a hash table. Thus each subtree check takes O(1) time, and since there can be k subtrees of length k−1 and n candidates, it takes O(nk) time to perform the pruning check for the patterns in each iteration. In the AP implementation, all the candidate itemsets are configured on the AP and checked against the input transaction in parallel. The time complexity of the AP solution is O(m), where m is the number of frequent candidates of the previous level. Because the support threshold here is 100%, we can remove the counter element of the ARM-AP design which is the main constraint of the AP board utilization.

When the number of generated candidates is relatively small, the CPU implementations beats the AP because of the AP configuration overhead. However, when the number of candidates starts to grow, the AP implementation provides a much faster solution. This step is a very light-weighted kernel and does not require a pass of input trees (does not depend on the dataset), however, it accommodates a large number of candidates in an early stage.

Intersection Pruning

In order to pass this pruning stage, (1) all the subset of a (k+1)-candidates, which are the members of k-frequent-candidate, should happen in the same input tree, and (2) the number of joint happening must be more than the minimum support threshold. Assuming $C_{5i}$ from FIG. 3 has passed the subset pruning stage and all its subset has been frequent. Also, assuming there is a database of four trees $\{T_1; T_2; T_3; T_4\}$, where $F_{4i}$ occurs in $\{T_1; T_2; T_4\}$, $F_{4j}$ occurs in $\{T_1; T_4\}$, $F_{4k}$ occurs in $\{T_1; T_2; T_3\}$, and $F_{4l}$ occurs in $\{T_1; T_4\}$. As we see, the set of $\{F_{4i}; F_{4j}; F_{4k}; F_{4l}\}$ (which are the subset of $C_{5i}$) jointly happens in only $T_1$. If the Rminsup is less than 25%, $F_{5i}$ will pass the second stage, otherwise, it will be pruned. Intersection pruning can directly map to the ARM, where itemsets are the set of (k+1)-candidate and items in the itemsets are the set of k-frequent-candidate for each candidate.

The number of input transactions is equal to the number of trees in the database and the size of each transaction is equal to the number of frequent candidates contained in the transaction, which creates the AP input stream. If all the frequent candidates fit into the AP boards, one pass of input stream checks the frequency of intersection pruning for all the candidates at the same time, otherwise, the automaton macros will be loaded with a new set of candidates, which requires another pass of the input stream. The CPU implementation uses a 1D array for each frequent candidate to keep track of tree identification list. Size of the array is equal to the number of trees in the database.

Downward Pruning

In order to further prune the search space, downward pruning kernel is proposed which simplifies tree representation to a sequence of root-to-children paths. Downward string representation starts from the root of the tree and traverses all the paths from the root to the terminal children. Delimiter ';' separates different paths and delimiter '#' represent the end of downward representation string of an input tree. Assume mining ordered subtrees, it is important to traverse from the left-most path to the rightmost path. For example in FIG. 4, the vertical representation of subtree $ST_2$ is AC, AB #. When delimiter '#', encoded at the end of subtree downward representation, matches to the input stream, the associated counter counts up by one and then, matching with the next tree starts from the root of the subtree.

For all the generated and survived (k+1)-candidates from the previous stage, the downward string representation are created. These candidates can be interpreted as the candidate sequences in sequential pattern mining, where the nodes in a path represent an itemset and the paths create the sequence of itemsets. The downward representation for the input tree is considered as the input stream for the AP. Downward representation of a tree preserves ancestor/descendant relationship (the parent-child relationship is its special case). It ensures for all the subtrees candidates with a degree no more than one (we call them line-shaped candidates), the final decision regarding their frequency will be made at this stage and no false positive candidate will survive from this kernel. This is particularly true because line-shaped candidates are equivalent to an itemset in SPM, where no branching information is required. This property is helpful when extracting the pure frequent candidate set is required. However, downward pruning may repeat the nodes with the degree more than one in different paths. For example, in FIG. 4, node B in tree $T_0$ is considered for the first path and the second path in the downward representation. This repetitive representation causes some false positives. For example, subtree $ST_3$ is considered a subtree of Tree $T_0$ based on sequential pattern checking. Connectivity pruning in the next section is a complementary pruning strategy dealing with this problem. $ST_2$ in FIG. 4 will be correctly pruned as the subsequence of AC; AB # is not included in the sequence of ABC; ABD; AE #. Also, $ST_1$ is an example of the embedded candidate which survives this stage and it is a true positive. Both $ST_1$ and $ST_3$ will be checked further at the next pruning kernel. The quality of downward pruning directly depends on the topology of the trees in the database. Deeper trees will benefit more from the downward pruning. Downward kernel prunes the subtrees that do not satisfy the ancestor-descendant relationship (which by default should be met in the subtree inclusion checking) and as a result, will not cause any false negatives.

Connectivity Pruning

Figure 4:
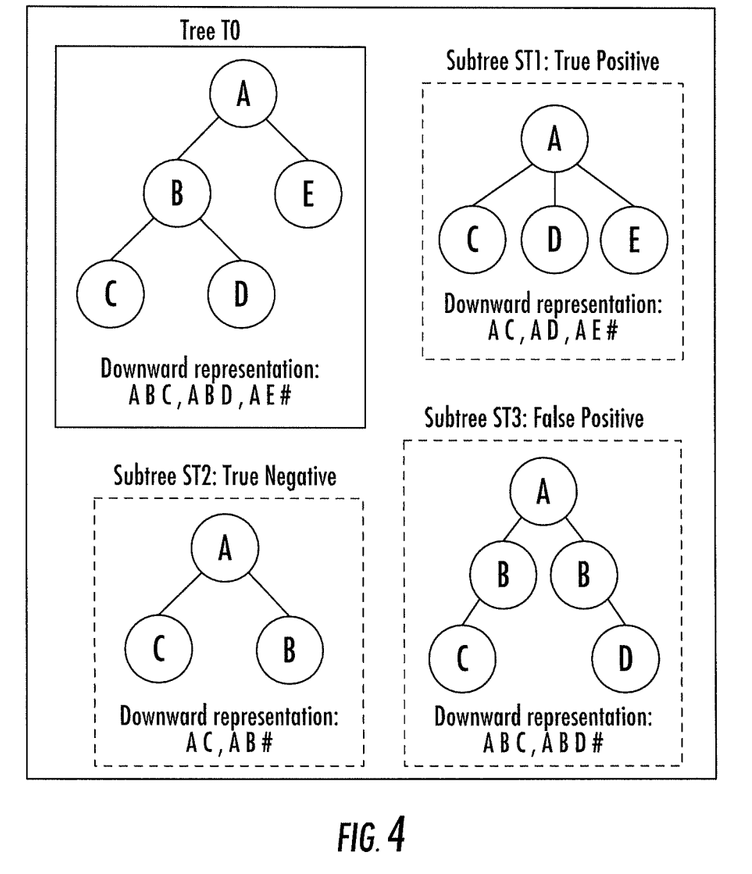
FIG. 4 is a schematic illustration of downward pruning in some embodiments.

Connectivity pruning is mainly proposed to identify the situations when the downward string representation generates two itemsets out of one node (which allows some false positives survive downward pruning). For example, in FIG. 5, the downward representation of $T_0$ repeats node B twice, which allows ST survive as a false positive. Connectivity pruning finds a mapping of the subtree root-path to the input tree and then, look for the children sequences of the last node in the root-path from left to right in the searching tree. Root-path of a subtree is the path from the root to the first node with the degree more than one. For example, the root-path of $ST_2$ in FIG. 4 is AB. Connectivity string representation: cconnectivity representation of a subtree consists of the root-path followed by the delimiter ':', and then, the pre-order representation of the children from the left-most path to the right-most path separated by the delimiter ','.

Figure 5:
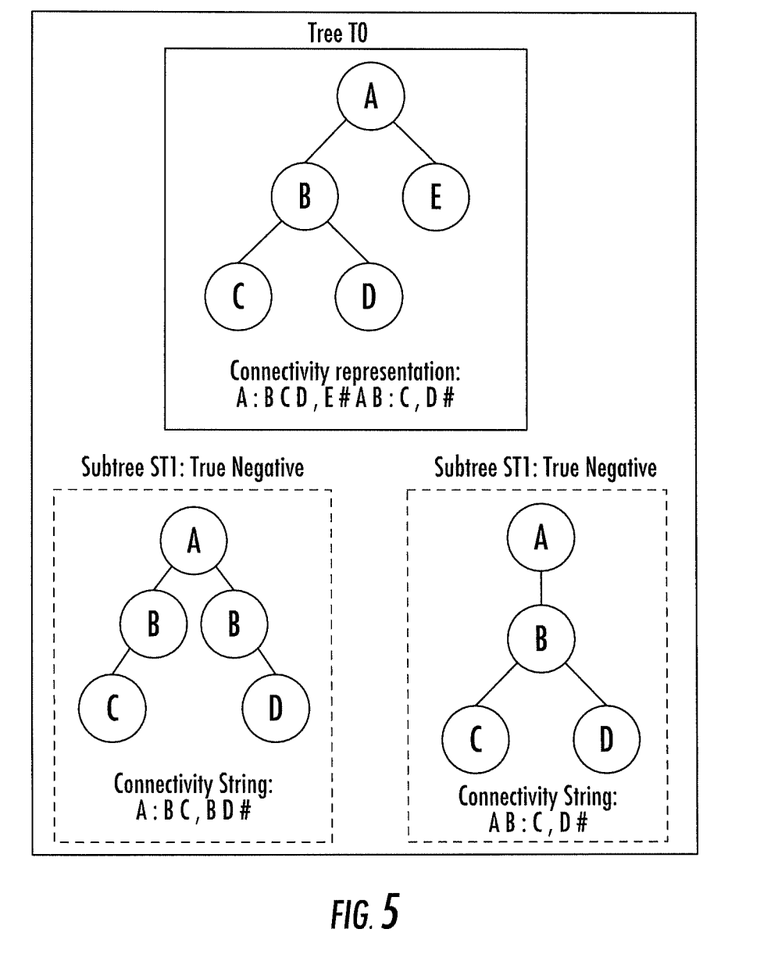
FIG. 5 is a schematic illustration of connectivity pruning in some embodiments.

For example in FIG. 5, the string representation of $ST_1$ is A:BC, BD #, where the root-path is A and the pre-order representations of its children are BC and BD which are separated by the ','. In order to detect the subtree in an input tree, the input tree connectivity representation should be extended by all the paths from the root to all the node with the degree more than two. Take the input tree $T_0$ as an instance, where first, A is considered as the root-path and is followed by the left-side children (BCD) and the right-side child (K), and second, AB is considered as the root path tailed by the B's children. Delimiter '#' separates root path sets in the trees and subtree inclusion checking starts from the subtree root after '#' appears in the input stream.

This pruning kernel can directly map to the SPM problem, where the root path and children are the itemsets and the nodes are the items. Similarly to SPM, the order between the itemsets matters. However, unlike SPM where the order between the items in the itemsets does not matter, for the connectivity checking, the items order which follows pre-order traversing of the children subtree, does matter. In other words, the ordering of the items increases the chance of pruning, if the subtree is not included in the tree. Fortunately, in AP implementation of SPM, having a pre-defined order of the items helps simplify the automata structure, which connectivity checking by default follows the rule of ordering. Connectivity pruning does not cause any false negatives because it relaxes necessary tree structure properties in order to check subtree inclusion. Connectivity pruning can further be extended to flatten more complicated structures than root-path in order to have more precise pruning, but it is used to generate a longer input stream of the database.

Pruning Corollaries

After applying all four pruning kernels, the remaining set of candidate subtrees are a potential set of frequent subtree candidates, which have passed certain structural checking. However, all the 3-candidates in the final set are 3-frequent-candidates. These candidates can only have two different topologies; (1) a root and two children connect to the root (triangle-shaped), and 2) a root with one child and one grandchild (line-shaped). As discussed before, lined-shape patterns will be properly pruned in the downward stage. Connectivity pruning also perfectly trims triangle-shape ones. This is because the root path has just one node, which is the root itself and the left and right child are the only node and do not have hierarchical structure, and they only need to appear (in order) in two different branches of the equivalent tree node to the subtree root.

Figure 6:
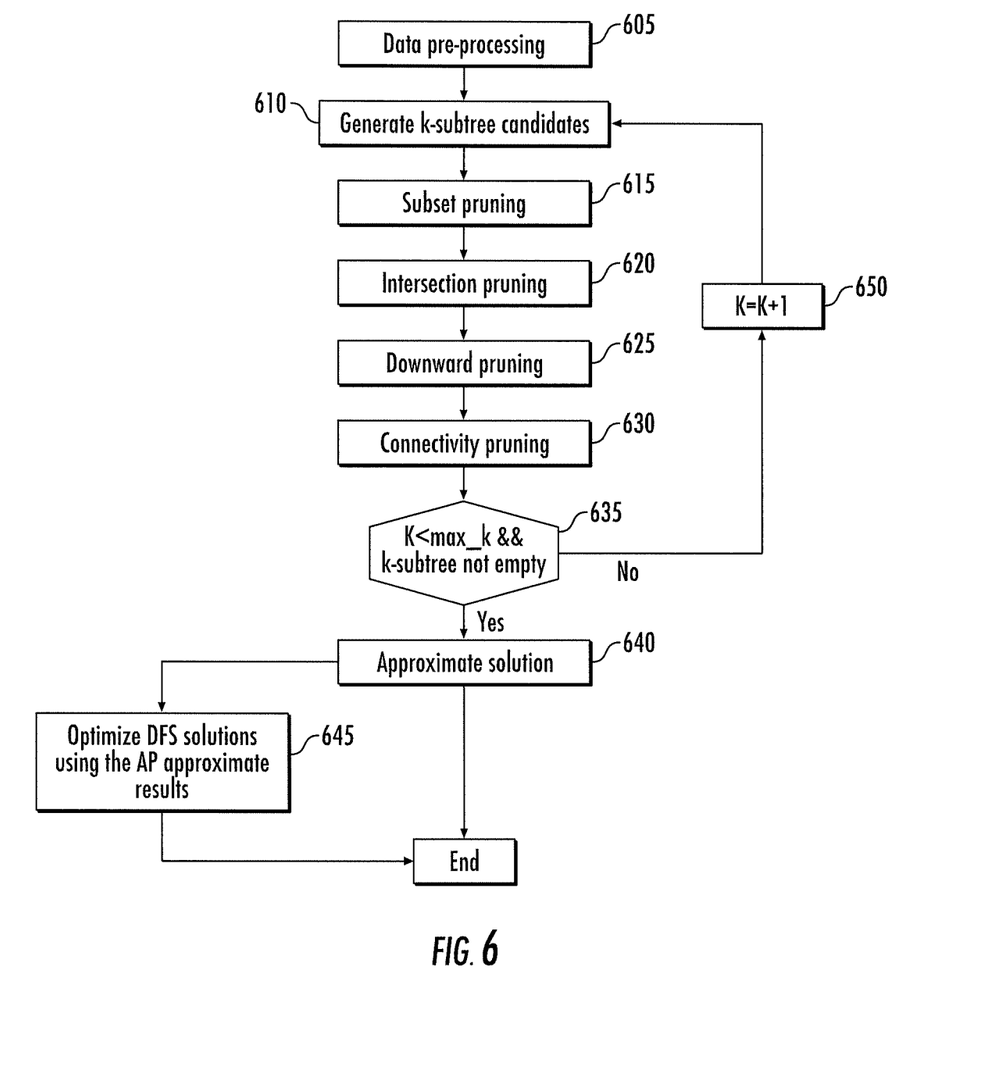
FIG. 6 is a flowchart illustrating a workflow of the AP-accelerated FTM in some embodiments according to the invention.

FIG. 6 is a flowchart illustrating a workflow of the AP-accelerated FTM in some embodiments according to the invention. Prior to the processing of FIG. 6 the input database is provided in horizontal string encoded format (block 605) and k-subtree candidates are generated (block 610). Then, the appropriate precompiled template macro of automaton structure for ARM or SPM pattern is selected according to k (size of itemset or sequence candidate) and is configured on the AP board. The candidates are generated on the CPU and are filled into the selected automaton template macro. The input data formulated in pre-processing is then streamed into the AP board for counting.

The four stages of pruning are applied in sequence in FIG. 6. In particular, the subset pruning (block 615), the intersection pruning (block 620), the downward pruning (block 625), and the connectivity pruning (block 630) are performed in sequence. For all the pruning stages, the corresponding AP input stream is generated.

While there are k-candidates left to be processed on the AP, the AP computation (symbol replacement and matching) and pre-processing of the next-level pruning kernel can be done in parallel. At the end of connectivity pruning stage, either k has reached the maximum size or k-frequent-candidate set is empty (block 635 and 650), the approximate solution is generated (block 640), which is a set of potentially frequent candidates. Depending on the final application, the approximate results can either be directly used with no further final pruning or can be considered as the ground candidate set for an exact FTM solution (block 645).

It will be understood that, although the terms first, second, etc. may be used herein to describe various elements, these elements should not be limited by these terms. These terries are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a," "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method of searching tree-structured data, the method comprising:
   identifying all labels associated with nodes in a plurality of trees including the tree-structured data;
   determining which of the labels is included in a percentage of the plurality of trees that exceeds a frequent threshold value to provide frequent labels;
   defining frequent candidate sub-trees for searching within the plurality of trees using combinations of only the frequent labels; and then
   searching for the frequent candidate sub-trees in the plurality of trees including the tree-structured data using a plurality of pruning kernels instantiated on a non-deterministic finite state machine to provide a less than exact count of the frequent candidate sub-trees in the plurality of trees, wherein the non-deterministic finite state machine is instantiated using a non-von Neumann processor architecture and the identifying, the determining and the defining are instantiated using a von Neumann processor architecture; and
   wherein after the searching for the frequent candidate sub-trees in the plurality of trees including the tree-structured data using the plurality of pruning kernels instantiated on the non-deterministic finite state machine to provide the less than exact count of the frequent candidate sub-trees in the plurality of trees using the non-von Neumann processor architecture further comprises:
   searching for remaining frequent candidate sub-trees in the plurality of trees including the tree-structured data using the Von Neumann processor architecture to provide an exact count of the frequent candidate sub-trees in the plurality of trees.

2. The method of claim 1 wherein searching for the frequent candidate sub-trees in the plurality of trees including the tree-structured data using the plurality of pruning kernels instantiated on the non-deterministic finite state machine comprises:
   using each of the plurality of pruning kernels to successively remove candidates determined to be infrequent from subsequent searching.

3. The method of claim 2 wherein each of the plurality of pruning kernels instantiated on the non-deterministic finite state machine is configured to remove the candidates determined to be infrequent based on a respective feature of the tree-structured data.

4. The method of claim 3 wherein the plurality of pruning kernels instantiated on the non-deterministic finite state machine comprises:
   a first pruning kernel configured to remove the candidates based on whether the candidates adhere to a downward closure property to provide a first set of frequent candidates.

5. The method of claim 4 wherein a second pruning kernel is configured to remove the candidates based on a percentage of trees in the tree-structured data that include all of the first set of frequent candidates to provide a second set of frequent candidates.

6. The method of claim 5 wherein a third pruning kernel is configured to remove the candidates based on whether an ancestor/descendant relationship is present in the second set of frequent candidates to provide a third set of frequent candidates.

7. The method of claim 6 wherein a fourth pruning kernel is configured to remove the candidates based on whether a sibling relationship is present in the third set of frequent candidates to provide the less than exact count of the frequent candidate sub-trees in the plurality of trees.

8. The method of claim 7 wherein the plurality of pruning kernels instantiated on the non-deterministic finite state machine are configured to remove the candidates determined to be infrequent using a non-von Neumann processor architecture, the method further comprising:
   searching for remaining frequent candidate sub-trees in the plurality of trees including the tree-structured data using a von Neumann processor architecture to provide an exact count of the frequent candidate sub-trees in the plurality of trees.

9. A search circuit comprising:
   a non-von Neumann architecture processor circuit configured to search for frequent candidate sub-trees in a plurality of trees of nodes including tree-structured data using a plurality of pruning kernels instantiated on a non-deterministic finite state machine to provide a less than exact count of the frequent candidate sub-trees in the plurality of trees, wherein the plurality of pruning kernels instantiated on the non-deterministic finite state machine are within a category of regular programming languages wherein:
   the search circuit is further configured to define the frequent candidate sub-trees for searching within the plurality of trees on a von Neumann architecture processor circuit using only combinations of frequent labels; and
   wherein the von Neumann architecture processor circuit is configured to identify all labels associated with nodes in the plurality of trees including the tree-structured data; and
   wherein the von Neumann architecture processor circuit is configured to determine which of the labels is included in a percentage of the plurality of trees that exceeds a frequent threshold value to provide the frequent labels;
   wherein the von Neumann architecture processor circuit is configured to search for remaining frequent candidate sub-trees in the plurality of trees including the tree-structured data to provide an exact count of the frequent candidate sub-trees in the plurality of trees.

10. The search circuit of claim 9 wherein the von Neumann architecture processor circuit is configured to search for the frequent candidate sub-trees in the plurality of trees including the tree-structured data using the plurality of pruning kernels instantiated on the non-deterministic finite state machine using each of the plurality of pruning kernels to successively remove candidates determined to be infrequent from subsequent searching.

11. The search circuit of claim 10 wherein each of the plurality of pruning kernels instantiated on the non-deterministic finite state machine is configured to remove the candidates determined to be infrequent based on a respective feature of the tree-structured data.

12. The search circuit of claim 11 wherein the plurality of pruning kernels instantiated on the non-deterministic finite state machine comprises:
   a first pruning kernel configured to remove the candidates based on whether the candidates adhere to a downward closure property to provide a first set of frequent candidates.

13. The search circuit of claim 12 wherein a second pruning kernel is configured to remove the candidates based on a percentage of trees in the tree-structured data that include all of the first set of frequent candidates to provide a second set of frequent candidates.

14. The search circuit of claim 13 wherein a third pruning kernel is configured to remove the candidates based on whether an ancestor/descendant relationship is present in the second set of frequent candidates to provide a third set of frequent candidates.

15. The search circuit of claim 14 wherein a fourth pruning kernel is configured to remove the candidates based on whether a sibling relationship is present in the third set of frequent candidates to provide the less than exact count of the frequent candidate sub-trees in the plurality of trees.

* * * * *

UNITED STATES PATENT AND TRADEMARK OFFICE
CERTIFICATE OF CORRECTION

PATENT NO.            : 11,314,750 B2                              Page 1 of 1
APPLICATION NO.       : 16/246641
DATED                 : April 26, 2022
INVENTOR(S)           : Sadredini et al.

It is certified that error appears in the above-identified patent and that said Letters Patent is hereby corrected as shown below:

In the Specification

Column 1, Line 9 Statement of Government Support: Please replace the paragraph in its entirety to read:
-- This invention was made with government support under Grant No. HR0011-13-3-0002 awarded by the Department of Defense/Defense Advanced Research Projects Agency (DARPA) and Grant No. CCF-1355602 awarded by the National Science Foundation. The government has certain rights in the invention. --

Column 9, Line 51: delete "allows ST services" and insert -- allows $ST_3$ services --

Column 10, Line 5: delete "right-side child (K)" and insert -- right-side child (E) --

Signed and Sealed this
Fourteenth Day of June, 2022

Katherine Kelly Vidal
*Director of the United States Patent and Trademark Office*